(12) United States Patent
Ludwig

(10) Patent No.: US 9,255,783 B2
(45) Date of Patent: Feb. 9, 2016

(54) SENSOR ARRANGEMENT FOR CAPTURING A TORQUE

(75) Inventor: Ronny Ludwig, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 13/883,469

(22) PCT Filed: Sep. 16, 2011

(86) PCT No.: PCT/EP2011/066130
§ 371 (c)(1),
(2), (4) Date: May 3, 2013

(87) PCT Pub. No.: WO2012/062502
PCT Pub. Date: May 18, 2012

(65) Prior Publication Data
US 2013/0221957 A1    Aug. 29, 2013

(30) Foreign Application Priority Data

Nov. 8, 2010 (DE) .......................... 10 2010 043 559

(51) Int. Cl.
*G01B 7/30* (2006.01)
*G01L 3/10* (2006.01)

(52) U.S. Cl.
CPC .. *G01B 7/30* (2013.01); *G01L 3/104* (2013.01)

(58) Field of Classification Search
CPC ......... G01L 3/104; G01L 5/221; G01L 3/101; G01L 3/102; G01L 3/105; G01L 5/0009; G01L 25/003; G01L 3/1471; G01L 3/242; G01L 31/2829; G01L 33/02; G01L 33/18; H01L 41/20; G01P 15/132; G01P 3/44; G01P 3/487; G01P 3/488; G01P 7/00; G01R 31/2829; G01R 33/02; G01R 33/18; G01B 7/30

See application file for complete search history.

(56) References Cited

U.S. PATENT DOCUMENTS

| | | | | | |
|---|---|---|---|---|---|
| 4,784,002 | A | * | 11/1988 | Io .............................. | 73/862.331 |
| 4,907,462 | A | * | 3/1990 | Obama et al. ............ | 73/862.335 |
| 7,602,173 | B2 | | 10/2009 | Reichert | |

(Continued)

FOREIGN PATENT DOCUMENTS

| | | |
|---|---|---|
| DE | 4231646 | 8/1993 |
| DE | 102004023801 | 8/2005 |

(Continued)

OTHER PUBLICATIONS

PCT/EP2011/066130 International Search Report dated Dec. 15, 2011 (English Translation and Original, 6 pages).

*Primary Examiner* — Vinh Nguyen
(74) *Attorney, Agent, or Firm* — Michael Best & Friedrich LLP

(57) ABSTRACT

The invention relates to a sensor arrangement (2) for capturing a torque acting on a shaft (14), wherein the sensor arrangement (2) comprises a sensor unit (4) with a sleeve (34), on which at least one sliding element and at least one first sensor which is sensitive to magnetic fields are arranged, and a magnetic-flux unit (6) with two magnetic flux-conducting rings (28, 30), wherein the at least one sliding element is arranged between the magnetic flux-conducting rings (28, 30), wherein the sensor unit and the magnetic-flux unit (6) are rotated relative to one another during a rotation of the shaft (14), and wherein the at least one sensor which is sensitive to magnetic fields captures a magnetic flux conducted by the rings (28, 30).

16 Claims, 20 Drawing Sheets

(56) References Cited

U.S. PATENT DOCUMENTS

2004/0194560 A1   10/2004   Froehlich et al.
2007/0180905 A1    8/2007   Kaoku et al.
2009/0107259 A1*  4/2009   Ishihara et al. .......... 73/862.193
2012/0152034 A1*  6/2012   Kaess et al. .............. 73/862.333

FOREIGN PATENT DOCUMENTS

| | | |
|---|---|---|
| DE | 102005011196 | 9/2006 |
| EP | 1424544 | 6/2004 |
| FR | 2689633 | 10/1993 |
| GB | 2050623 | 1/1981 |

* cited by examiner

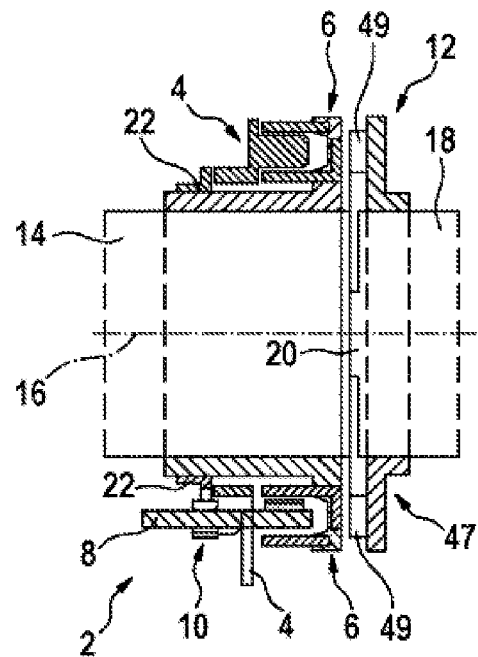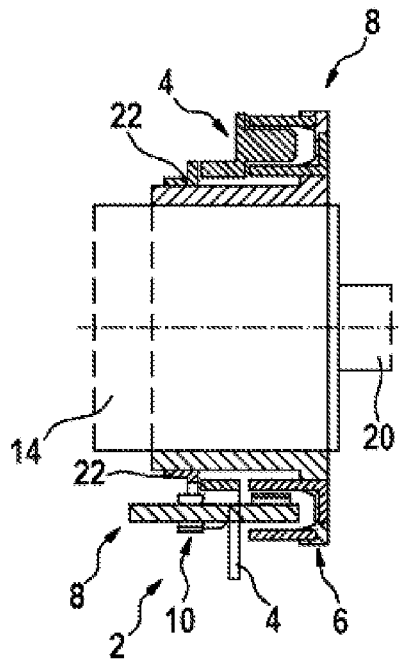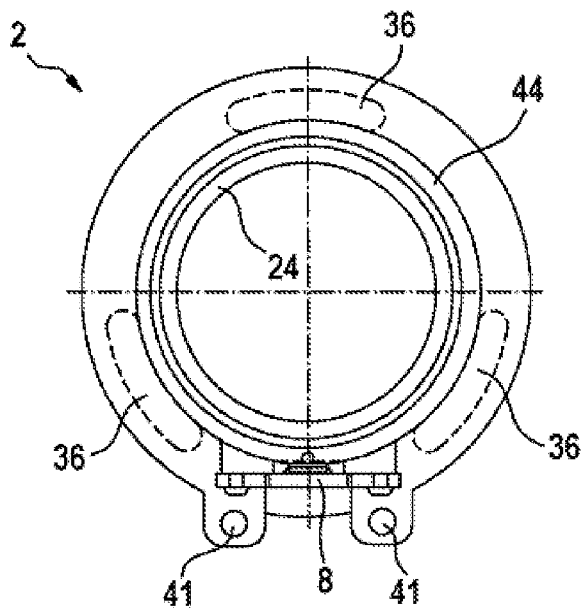

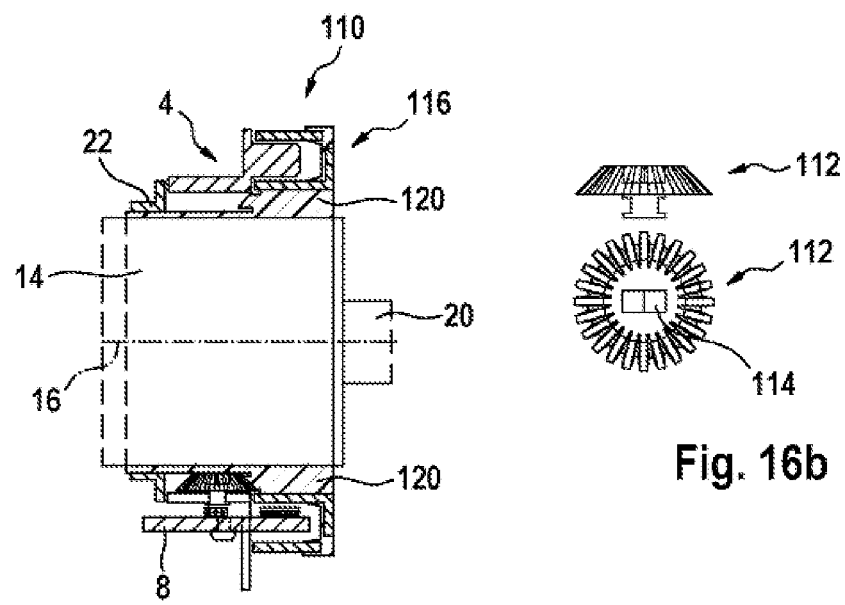
Fig. 16a
Fig. 16b
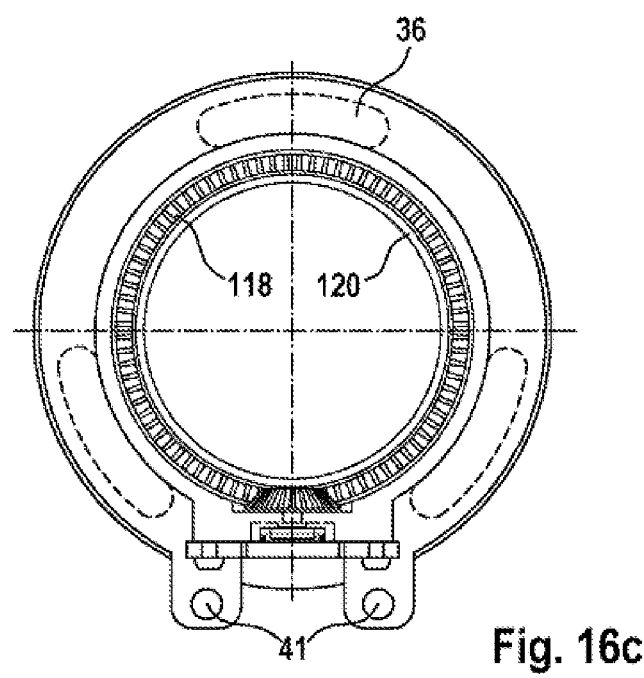
Fig. 16c

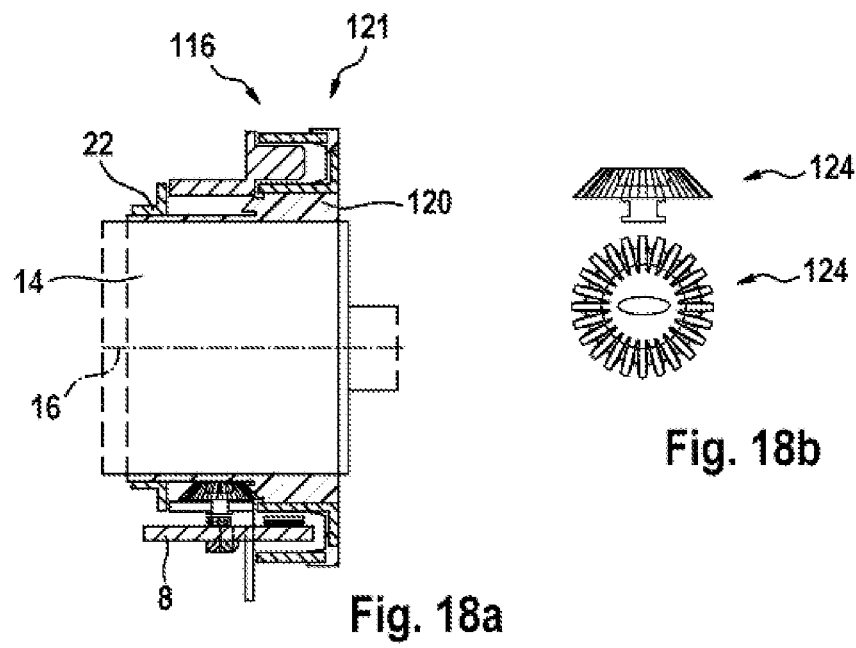
Fig. 18a
Fig. 18b
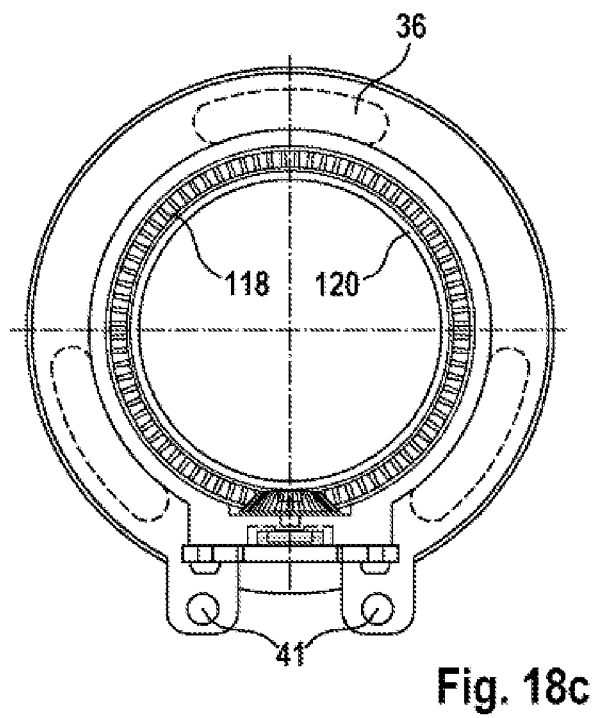
Fig. 18c

SENSOR ARRANGEMENT FOR CAPTURING A TORQUE

BACKGROUND OF THE INVENTION

The invention relates to a sensor arrangement and to a method for capturing a torque.

The invention comprises a sensor arrangement which functions according to the magnetic measuring principle and has the purpose of capturing a torque. Nowadays, magnetic measuring principles are frequently used in the field of torque and rotational angle sensors. In said sensors, a magnetic field which changes during a rotational movement is usually detected with Hall sensors. Furthermore, a resulting signal is converted into a rotational angle signal or torque signal.

Document DE 10 2005 031 086 A1 describes a sensor arrangement for capturing a differential angle. In this document it is proposed that magnetic field information of a magnetic circuit, which has a magnetic pole wheel and a ferromagnetic flux ring with teeth, is evaluated with at least one magnetic-field-sensitive sensor element. The teeth for radially tapping the magnetic field information of the magnetic pole wheel run in the radial direction.

In known sensor arrangements, the magnetic units and the carrier of magnetic-flux-conducting rings are mounted on two shafts which are connected to one another by means of a torque rod. The sensor unit is attached to a surrounding housing by means of a plug or a circumferential plug seal. As a result, the sensor arrangement is, however, mechanically overdetermined. Furthermore, a very large tolerance chain results between the surrounding housing with the mounted sensor unit and the carrier of magnetic-flux-conducting rings on the shaft, since a large air gap is present between the Hall circuits and the magnetic-flux-conducting rings which are composed of metal. This in turn requires a large magnetic field, for which reason significant reduction of the tolerance chain is aimed at.

SUMMARY OF THE INVENTION

In a configuration, the sensor arrangement is embodied as a torque sensor, measuring according to a magnetic principle, for a shaft, in which torque sensor a sensor unit (SU) is mounted in a self-guiding fashion between the magnetic-flux-conducting rings of a magnetic flux unit (Flux Tube Unit, FTU), usually directly at and/or between the magnetic-flux-conducting rings, and is axially secured. Furthermore, the sensor unit can be constructed as a free-falling injection molded part. Such a free-falling injection molded part usually drops automatically out of an injection mold after an injection molding method has been carried out by an injection molding machine, and does not need to be removed from the injection mold.

In one possible configuration of the sensor arrangement, the sensor unit comprises three so-called sliding shoes, arranged at intervals of 120°, as sliding elements which are arranged between the magnetic-flux-conducting rings. The sensor unit is supported in a sliding fashion and/or centered at least partially by the three sliding shoes, as a rule on just one magnetic-flux-conducting ring, for example the inner ring, of the magnetic flux unit, in order to avoid mechanical overdetermination or sticking of the sensor unit on non-round magnetic-flux-conducting rings. The sliding shoes of the sensor unit which is usually formed from plastic slide here on the metal of the magnetic-flux-conducting rings which are attached to a ring-shaped or sleeve-shaped supporting element as a component of the magnetic flux unit which is made of plastic. The sensor unit is usually guided axially in a sliding fashion between an end side of the inner magnetic-flux-conducting ring and a locking ring. The sensor unit which is made of plastic also slides on or against metal here. A groove in the locking ring is used for an index function for counting revolutions.

In a further configuration of the sensor arrangement, in contrast to the first embodiment, the magnetic-flux-conducting rings are encapsulated completely by injection molding with plastic and are accordingly embedded in the supporting element and/or a U-shaped double ring of the supporting element, with the result that the sensor unit which is made of plastic is also supported in turn in a sliding fashion on plastic. Through a suitable selection of the plastics for the sensor unit and the magnetic flux unit, an optimum sliding function is made possible between at least one sliding element, usually a number of sliding shoes, the sensor unit and the magnetic flux unit. The locking ring for the axial support is also made of plastic and comprises an injected metal plate for the index function for counting revolutions.

In a further embodiment which is provided, the bearing principle is reversed, i.e. the sliding function of the sensor unit is implemented by means of a sliding shoe which rotates through at least 270° as the sliding element on the sensor unit to form bearing journals or sliding journals of the magnetic flux unit. As a result, a punctiform support of plastic on plastic occurs in the radial and axial directions between the sensor unit, usually between at least one bearing element of the sensor unit, and the magnetic flux unit with the smallest possible coefficient of friction. As a result, inter alia, an out-of-roundness of at least one of the magnetic-flux-conducting rings usually has no influence on the bearing function.

A printed circuit board as a further component of the sensor arrangement is attached to the sensor unit and can comprise as standard components, for example, chip resistors, chip capacitors, Hall ASICs in an SMD design (surface mounted device), for example as a TSSSOP or SOT23 from Robert Bosch GmbH etc. and be mounted by means of SMT (Surface Mount Technology) soldered using the reflow method. Selective soldering processes are therefore unnecessary. The printed circuit board is fixedly mounted to the sensor unit in the axial direction. The Hall ASICs or Hall circuits which are necessary for the measurement of the torque are located here on a section of the printed circuit board which is referred to as a finger and is arranged between the two rings of the magnetic flux unit.

In order to implement an optional steering angle function, it is possible to attach a bevel gear to the sensor unit, which bevel gear meshes in bevel toothing on the magnetic flux unit. In this context, the bevel toothing is usually integrated into the ring-shaped or sleeve-shaped bearing element. This is possible as a result of the direct support between the sensor unit, usually the at least one bearing element of the sensor unit, and the magnetic flux unit. In this context, the permanent magnet can be mounted on the printed circuit board. Alternatively, an NiFe metal plate, which changes the magnetic flux when the shaft rotates, can be arranged in or on the bevel gear.

The invention provides, inter alia, direct support and/or sliding support between the sensor unit, usually the at least one sliding element, and the magnetic-flux-conducting rings of the magnetic flux unit. The printed circuit board is arranged in the axial direction between the rings. In this context, components, which can be mounted by means of standard surface mounting technology and be soldered using the reflow method are used. The integration of a steering angle signal (SAS) can optionally be provided.

In one possible implementation, a short tolerance chain results between the sensor unit, to which the printed circuit board with the Hall circuits is assigned as magnetic-field-sensitive sensors, and the rings, since the latter are arranged directly one next to the other and therefore have tolerance with respect to one another. A layout of the printed circuit board is configured with the standard surface mounting, and therefore no wired components (THT) are necessary, which saves costs.

As a rule, only one standardized sensor unit is necessary for all the possible diameters of shafts. Furthermore, simple integration of an index function for counting revolutions of the shaft is possible by modifying the locking ring. The permanent magnet for the function can be mounted on the printed circuit board. This is more cost-effective than the mounting of the permanent magnet on the locking ring. It is also possible to provide a relatively simple construction and connecting technology for making available the sensor arrangement.

As a result of the direct support of the sensor unit in and/or on the magnetic-flux-conducting rings of the magnetic flux unit both in the radial and in the axial directions, it is possible to achieve a reduction in an air gap between the measuring Hall circuits and the rings of the magnetic flux unit. Complex selective soldering processes, for example wave soldering etc. can be dispensed with on the printed circuit board.

The first shaft for which a torque which acts on the first shaft can be determined is usually connected via a torsion rod to a further, second shaft. The two specified shafts can rotate coaxially with respect to one another about a common rotational axis, wherein the torsion rod is twisted or coiled and therefore a torque is generated between the two shafts. The specified components of the sensor arrangement, i.e. the sensor unit, the magnetic flux unit with the magnetic-flux-conducting rings, as well as the locking ring are assigned to one of the two shafts. This means in one embodiment of the invention that the magnetic flux unit is attached to the first shaft. In this context, the ring-shaped or sleeve-shaped supporting element encloses the shaft coaxially. The two magnetic-flux-conducting rings are also arranged coaxially with respect to the shaft and are attached via the supporting element to this first shaft, wherein at least one of the magnetic-flux-conducting rings is at least partially enclosed by the supporting element which is usually formed from plastic, and is therefore at least partially encapsulated by injection molding with plastic. In one configuration, the locking ring is also attached to the first shaft and arranged coaxially with respect to this first shaft. Accordingly, when the first shaft rotates, components of the magnetic flux unit and components of the locking ring are also rotated with the first shaft.

The sensor unit is attached in a positionally fixed fashion and/or to a component with respect to which the first shaft and therefore the components of the magnetic flux unit as well as of the locking ring can also rotate. In this context, the sensor unit comprises a sleeve, which can also be referred to as a ring, and which coaxially encloses the first shaft. At least one sliding element is attached running around on the sleeve, wherein this at least one sliding element and the sleeve are embodied in one piece. If the sensor unit has n sliding shoes as sliding elements, they can be arranged rotationally symmetrically with respect to one another on the sleeve at angles of 360°/n. If the at least one sliding element is embodied as a peripheral rail, it can extend through an angular range which is to be suitably selected. However, combinations of sliding shoes and/or peripheral rails which are arranged at any desired suitable angles with respect to one another on the sleeve and which extend through arcuate sections, to be suitably selected, along the sleeve, are also possible.

Irrespective of a specific configuration of the at least one sliding element, this at least one sliding element is supported in the radial direction between the magnetic-flux-conducting rings, wherein bearing play is present and/or provided between the at least one sliding element and at least one of the rings of the magnetic flux unit, with the result that the at least one sliding element and the rings and/or the supporting element for the rings can rotate in a manner free of friction with respect to one another.

The sleeve of the sensor unit is arranged in the axial direction between the locking ring and one of the two rings of the magnetic flux unit, usually the inner ring, wherein bearing play is also arranged between the sleeve and the locking ring as well as between the sleeve and the ring of the magnetic flux unit. As a result, likewise friction-free rotation of the sleeve of the sensor unit is also possible with respect to those further components of the sensor arrangement which are attached to the first shaft, when the first shaft rotates.

Furthermore, the sensor unit comprises at least one magnetic-field-sensitive sensor which is arranged on the sleeve at a position of said sleeve. For this purpose, the magnetic-field-sensitive sensor can be attached to the sleeve by means of a printed circuit board on which, in turn, the magnetic-field-sensitive sensor is arranged. In this context, the magnetic-field-sensor is also arranged between the two magnetic-flux-conductive rings of the magnetic flux unit.

Furthermore, what is referred to as the magnetic pole wheel can also be provided as a further component of the sensor arrangement. In this context, this magnetic pole wheel is embodied as a ring-shaped arrangement of permanent magnets, which arrangement is arranged on the second shaft which can rotate relative to the first shaft.

When the two shafts rotate relative to one another, the magnetic pole wheel is rotated relative to the magnetic-flux-conducting rings, as a result of which a difference in angle comes about between the magnetic pole wheel and the magnetic-flux-conducting rings. As a result of this difference in angle, a change in the magnetic field strength which is amplified by the rings is brought about in the region of the magnetic-field-sensitive sensor which is arranged in a fixed position with respect to the two shafts, which magnetic field strength can be converted into a signal which is dependent on the torque.

The sensor arrangement according to the invention is designed to carry out all the steps of the method which is presented. In this context, individual steps of this method can also be carried out by individual components of the sensor arrangement. Furthermore, functions of the sensor arrangement or functions of initial components of the sensor arrangement can be implemented as steps of the method. Furthermore, it is possible that steps of the method are implemented as functions of at least one component of the sensor arrangement or of the entire sensor arrangement.

Further advantages and configurations of the invention can be found in the description and the appended drawings.

It goes without saying that the features which are specified above and which will be explained below can be used not only in the respectively indicated combination but also in other combinations or alone, without departing from the scope of the present invention.

BRIEF DESCRIPTION OF THE DRAWINGS

FIG. 1 shows a schematic illustration of a first embodiment of the sensor arrangement according to the invention, FIG. 16 shows a schematic illustration of a fourth embodiment of the sensor arrangement with a first example of an arrangement for capturing a rotational angle, FIG. 18 shows a schematic illustration of a second example of an arrangement for determining a rotational angle, which arrangement can be used in an embodiment of the sensor arrangement according to the invention.

DETAILED DESCRIPTION

Figures 2A, 2B:
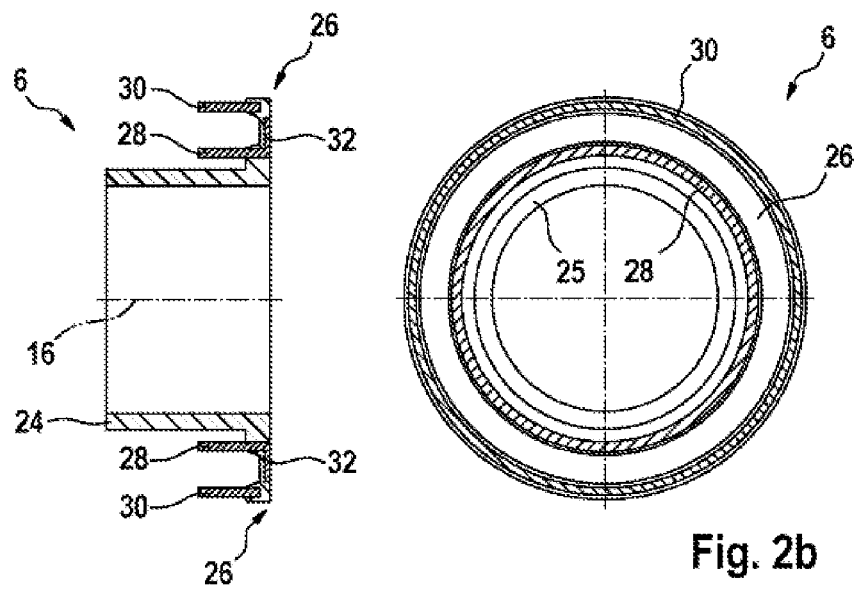
FIG. 2 shows a schematic illustration of details of a magnetic flux unit of the first embodiment of the sensor arrangement according to the invention.

The invention is illustrated schematically by means of embodiments in the drawings and is described in detail below with reference to the drawings.

The figures are described in a cohesive and comprehensive fashion, identical reference symbols denote identical components.

For the first embodiment of the sensor arrangement 2 according to the invention, which is illustrated schematically in FIG. 1, FIG. 1a shows a sensor unit 4, a magnetic flux unit 6, a printed circuit board 8 and an index magnet 10 and a magnetic unit 12. In FIG. 1b, the magnetic unit 12 is dispensed with. FIG. 1c shows the sensor arrangement 2 in a plan view.

There is provision that the magnetic flux unit 6 is arranged on, usually attached to, a first shaft 14 which rotates about a rotational axis 16. The sensor unit 4 is attached to a component (not illustrated further) and is therefore arranged in a positionally fixed fashion with respect to the first shaft 14. When the shaft 14 rotates, said shaft 14 rotates relative to the component. This results in a situation in which the magnetic flux unit 6 is also rotated relative to the sensor unit 4.

The magnetic unit 12 is arranged on a second shaft 18, which can rotate coaxially with respect to the first shaft 14 about the common rotational axis 16. The two specified shafts 14, 18 are connected to one another by means of a torsion rod 20. When the first shaft 14 rotates relative to the second shaft 18, the torsion rod 20 is twisted, as a result of which a torque is generated. This torque can be determined with all the embodiments of the sensor arrangement 2 according to the invention, which embodiments are also presented in the further figures.

Furthermore, FIG. 1 shows a locking ring 22 which is arranged on, for example, attached to, the shaft 14, as a further component of the sensor arrangement 2. When the shaft 14 rotates, the locking ring 22 also rotates relative to the sensor unit 4.

Figure 2C:
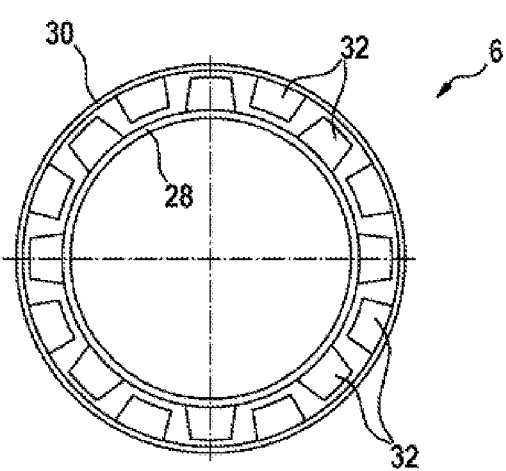

Details relating to the magnetic flux unit 6 of the first embodiment of the sensor arrangement 2 according to the invention will be described with reference to FIG. 2, wherein FIG. 2a shows the magnetic flux unit 6 in a sectional view, FIG. 2b shows the latter in a first plan view, and FIG. 2c shows the latter in a second plan view, in schematic form.

The magnetic flux unit 6 comprises a ring-shaped supporting element 24 with a double ring 26 which is U-shaped in profile and in which an inner magnetic-flux-conducting ring 28 and an outer magnetic-flux-conducting ring 30 are embedded. Furthermore, the two rings 28, 30 have radially oriented fingers 32 which are bent in opposite directions. The inner and the outer ring 28, 30 are, like the fingers 32 made of a ferromagnetic metal, usually an alloy such as, for example, NiFe. The rings 28, 30 are inserted by injection molding into plastic of the supporting element 24 and/or plastic of the U-shaped double ring 26 with tight tolerances as components of the supporting element 24.

Figures 3A, 3B:
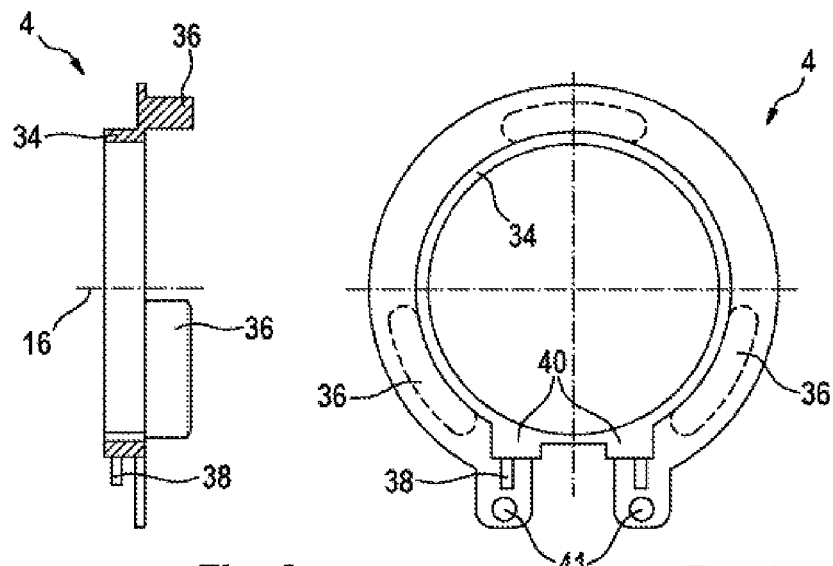
FIG. 3 shows a schematic illustration of details of the first embodiment of the sensor arrangement according to the invention.
Figure 3C:
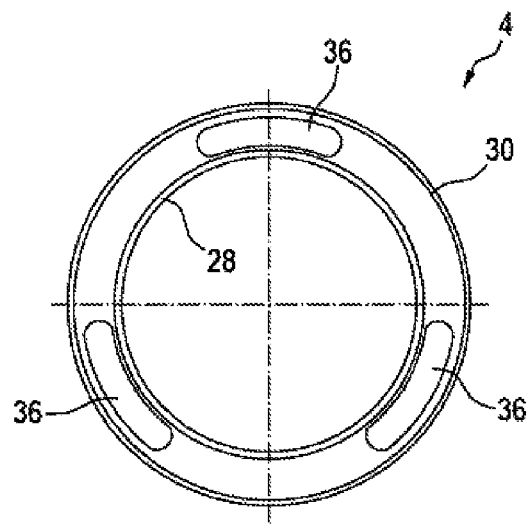

Details relating to the sensor unit 4 of the first embodiment of the sensor arrangement 2 according to the invention are illustrated schematically in FIG. 3. In this context, FIG. 3a shows the sensor unit 4 in a sectional view, FIG. 3b shows the sensor unit 4 in a first plan view, and FIG. 3c shows the sensor unit 4 and the two rings 28, 30 in a second plan view.

The sensor unit 4 is also embodied in a circular shape and comprises a sleeve 34 on which, in the present embodiment, three sliding shoes 36 which are offset by 120° are arranged. Irrespective of the embodiment of the sensor arrangement 2, the sensor unit 4 can comprise any desired number n of sliding shoes 36 which are arranged symmetrically along the sleeve 34 at an angular interval of 360°/n with respect to one another. Furthermore, FIG. 3 shows journals 38 for the printed circuit board 8, bearing faces 40 for the printed circuit board 8 and locking holes 41, with which the sensor unit 4 can be attached in a positionally fixed fashion to a housing which encloses the shaft 14.

The embodiment of the sensor unit 4 shown in FIG. 3 is embodied as a free-falling injection molded part to which the printed circuit board 8 with the electronic circuit, Hall circuits, passive components and a plug is vertically attached. In the example shown, the printed circuit board 8 can be attached to the sensor unit 4 by warm-calking journals 38. The three sliding shoes 36 which are arranged on the sleeve 34 of the sensor unit 4 are for this purpose designed to permit a partial supporting function between the sensor unit 4 and the rings 28, 30 of the magnetic flux unit 6.

In the first embodiment of the sensor arrangement 2, the sleeve 34 and the sliding shoes 36 of the sensor unit 4 are supported in a self-guiding fashion between the magnetic-flux conducting rings 28, 30 of the magnetic flux unit 6.

Figures 4A, 4B:
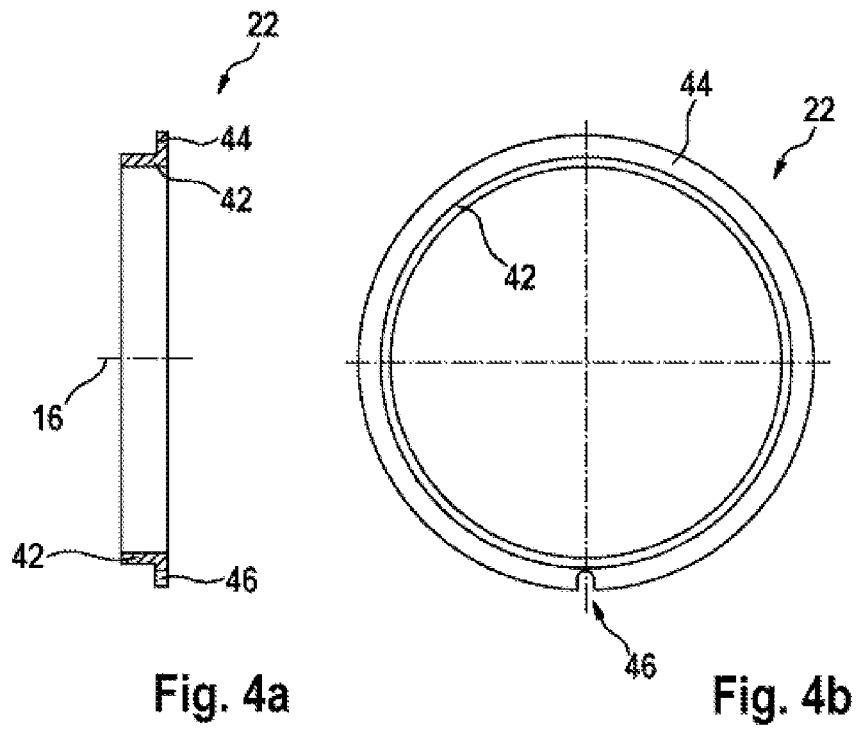
FIG. 4 shows a schematic illustration of details of a locking ring of the first embodiment of the sensor arrangement according to the invention.

Details relating to the locking ring 22 of the first embodiment of the sensor arrangement 2 are illustrated schematically in FIG. 4a in a sectional view, and in FIG. 4b in a plan view. This locking ring 22 which is composed here of metal comprises a sleeve 42 with a flange 44. Furthermore, the flange 44 comprises, as an index element, a groove 46 which is embodied as a switching point for an index for counting revolutions of the shaft 14 when the locking ring 22 rotates with the shaft 14 relative to the sensor units 4.

The magnetic unit 12 which is illustrated only in FIG. 1b comprises a supporting ring 47 on which a ring made of magnets 49, and therefore a so-called magnetic pole wheel, is arranged. When the two shafts 14, 18 shown in FIG. 1 rotate relative to one another, magnetic fields, which are generated by the magnets 49 are rotated relative to the sensor unit 4 and the printed circuit board 8. A magnetic flux of the magnetic fields of the rotating magnets 49 is usually concentrated by the magnetic flux unit 6 onto a region between the magnetic-flux-conducting rings 28, 30 in which the Hall circuit 60 (FIG. 6) is arranged.

As is illustrated in FIG. 1, the sensor unit 4 is locked axially with respect to the magnetic flux unit 6. For this purpose, the locking ring 22 which is composed of metal is mounted on the shaft 14, which locking ring 22 has in turn sliding properties with respect to the sensor unit 4. By means of the groove 46 in the locking ring 22, an index function can be implemented as revolution-counting function for counting the revolutions of the shaft 14 by means of the sensor arrangement 2.

Figure 5:
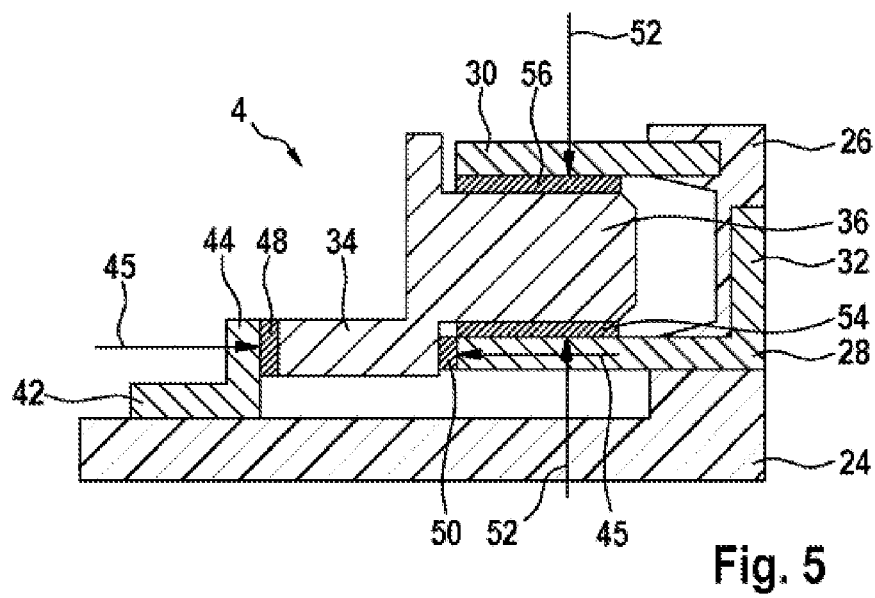
FIG. 5 shows a schematic illustration of details relating to a bearing arrangement of the first embodiment of the sensor arrangement according to the invention.

FIG. 5 shows in a schematic illustration a bearing arrangement of the sleeve 34 and of a sliding shoe 36, arranged on the sleeve 34, as a configuration of a sliding element relative to the flange 44 of the locking ring 22 and relative to the two rings 28, 30 of the magnetic flux unit 6. In this context, in order to provide axial support in the axial direction 45 between the flange 44 of the locking ring 22 and the sleeve 34 of the sensor unit 4, a first axial bearing plate 48 is provided. A second instance of axial bearing play 50 is also provided in the axial direction 45 between the sleeve 34 of the sensor unit 4 and the inner ring 28 of the magnetic flux unit 6. A first instance of radial bearing play 54 is provided in the radial direction 52 between the inner ring 28 of the magnetic flux unit 6 and the sliding shoe 36, and a second instance of radial bearing play 56 is provided between the sliding shoe 36 and the outer ring 30 of the magnetic flux unit 6.

The instances of bearing play 48, 50, 54, 56, which may comprise annular air gaps between the above-mentioned components of the sensor arrangement 2, bring about the self-guiding support between the sensor unit 4 and magnetic flux unit 6. The three sliding shoes 36 of the sensor unit 4 slide with defined play radially between the magnetic-flux-conducting rings 28, 30 of the magnetic flux unit 6, which play is made available with the two instances of radial bearing play 54, 56. The sensor unit 4 is locked axially by a support of the sensor unit 4 between the end side of the inner ring 28 via the second instance of axial bearing play 50 and the locking ring 52 via the first instance of axial bearing play 48. As a result of coupling via the specified instances of bearing play 48, 50, 54, 56, the sensor unit 4 and the magnetic flux unit 6 form one unit.

Figure 6:
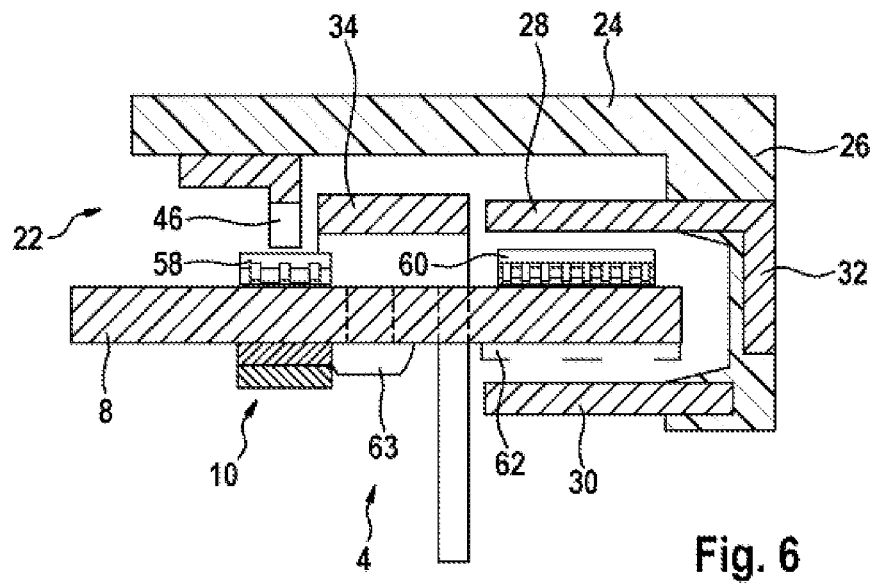
FIG. 6 shows a schematic illustration of details relating to a printed circuit board of the first embodiment of the sensor arrangement according to the invention.

Details relating to an arrangement of the printed circuit board 8 within the first embodiment of the sensor arrangement 2 according to the invention are illustrated schematically in FIG. 6. In this context, FIG. 6 shows that a Hall switch 58 is arranged as a magnetic-field-sensitive sensor on an inner side or an upper side of the printed circuit board 8 in the vicinity of the flange 44 of the locking ring 22. The index magnet 10 is also arranged at the same axial height on an underside or on an outer side of the printed circuit board 8. An Hall circuit 60, embodied as a dual Hall circuit, is arranged as a further magnetic-field-sensitive sensor between the two rings 28, 30 of the magnetic flux unit 6, on the upper side of the printed circuit board 8. An optional collector 62 is also indicated on the underside.

The printed circuit board 8 is mounted vertically on the sensor unit 4 and is attached in this context to the sensor unit 4 in such a way that a finger of the printed circuit board 8 on which the Hall circuit 60 is arranged is arranged between the magnetic-flux-conducting rings 28, 30 of the magnetic flux unit 6 and can therefore directly measure the magnetic flux.

In order to implement the index function, the Hall switch 58 is mounted on the printed circuit board 8, wherein, on the opposite side of the printed circuit board 8 the index magnet 10, which is embodied as a small permanent magnet, is mounted, for example, by bonding. The Hall switch 58 lies precisely in the plane of the locking ring 22. As soon as the groove 46 in the locking ring 22 passes the Hall switch 58 during a revolution of the shaft 14, the magnetic flux of the index magnet 10 is influenced and a signal is generated in the Hall switch 58. The printed circuit board 8 is attached to the sensor unit 4 by means of a warm-calked journal 63, which is produced from the journal 38 shown in FIG. 3 by warm-calking.

During operation of the first embodiment of the inventive sensor arrangement 2 which is presented in FIGS. 1 to 6, there is provision that the first shaft 14, on which the sensor unit 4, the magnetic flux unit 6 and the locking ring 22 are coaxially arranged, rotates relative to the second shaft 18 on which the magnetic unit 12 is coaxially arranged, as a result of which the torsion rod 20 is twisted as a connecting element between the two shafts 14, 18, as a result of which in turn a torque is generated.

In this context, the magnets 49 of the magnetic unit 12 rotate relative to the sensor unit 4, the magnetic flux unit 6, the printed circuit board 8 and the locking ring 22. The rotating magnetic fields which are generated by the magnets 48 are amplified by the rings 28, 30 and the fingers 32 of the magnetic flux unit 6. The changing magnetic fields are also detected by the Hall circuit 60 as a component of the sensor unit 4.

Figure 7:
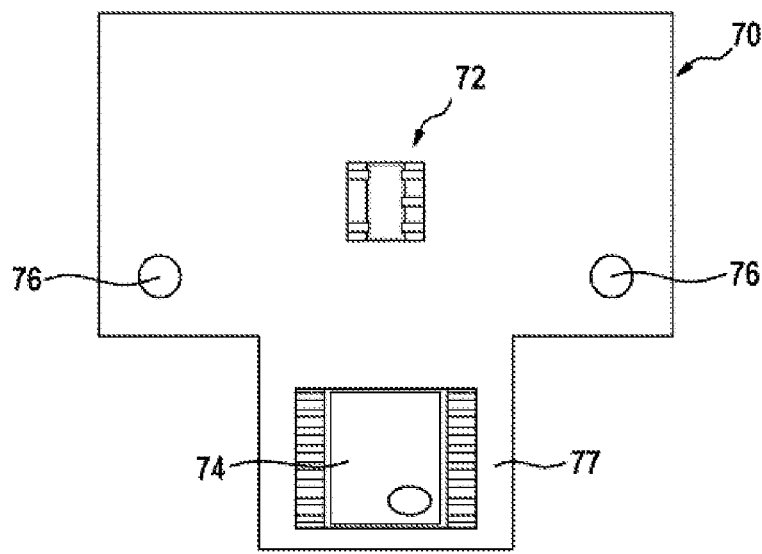
FIG. 7 shows a schematic illustration of a further example of a printed circuit board as a component of the sensor arrangement according to the invention.

FIG. 7 shows in a schematic illustration a further example of a printed circuit board 70 which can be used in different embodiments of arrangements according to the invention. Arranged on this printed circuit board 70 are a Hall switch 72, corresponding to the Hall switch 58 from FIG. 6, for capturing revolutions of the shaft 14 relative to the sensor unit 4, as well as a Hall circuit 74, corresponding to the Hall circuit 60 from FIG. 6. Furthermore, the printed circuit board 70 comprises two attachment openings 76, by means of which the printed circuit board 70 can be attached to a sensor unit 4, for example by means of the warm-calked journal 63. The printed circuit board 70 has a T shape, wherein the Hall circuit 74 or Hall circuit 60 is arranged on a finger 77 of the printed circuit board 70, which finger 77 has a reduced width. The finger 77 with the Hall circuit 74 or the Hall circuit 60 is to be arranged between the rings 28, 30 of an embodiment of the magnetic flux unit 2.

Figure 8A:
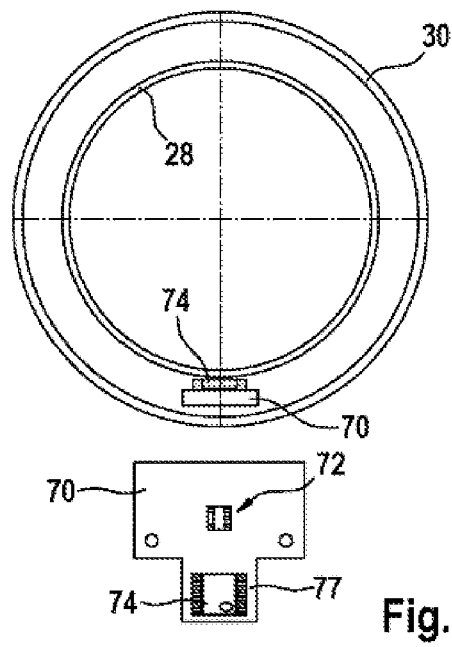
FIG. 8 shows examples of an arrangement of the printed circuit board from FIG. 7 within an embodiment of the sensor arrangement according to the invention.
Figure 8B:
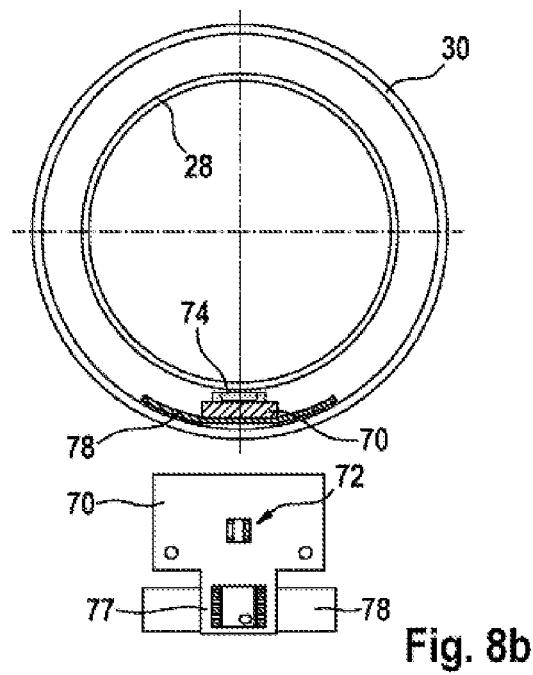

FIGS. 8a and 8b show, in a schematic illustration, how the printed circuit board 70 is arranged relative to the rings 28, 30 of the magnetic flux unit 6, for example. In this context, FIG. 8b additionally illustrates an example of a collector 78 which is mounted on the underside or rear side of the printed circuit board 70.

If the magnetic flux acting on the Hall circuit 74 is not sufficiently large, it is optionally possible to attach the collector 78 in the form of a metal plate, for example made of NiFe on the printed circuit board 8, which metal plate additionally collects the magnetic flux.

Figure 9A:
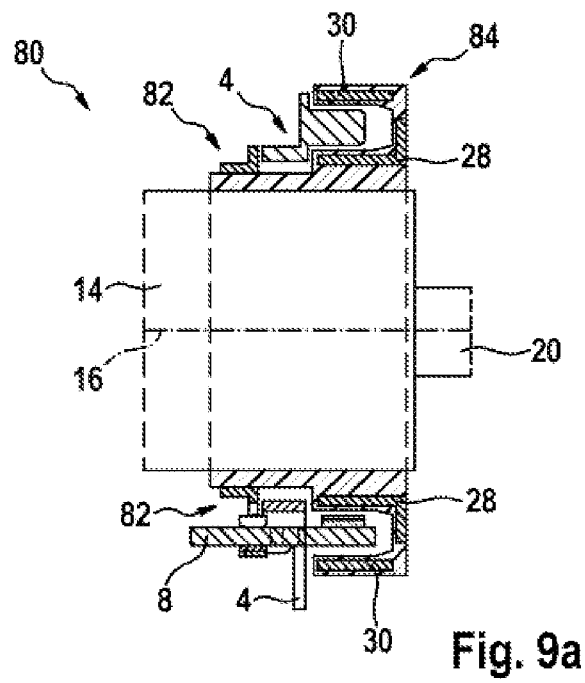
FIG. 9 shows a schematic illustration of a second embodiment of the sensor arrangement according to the invention.
Figure 9B:
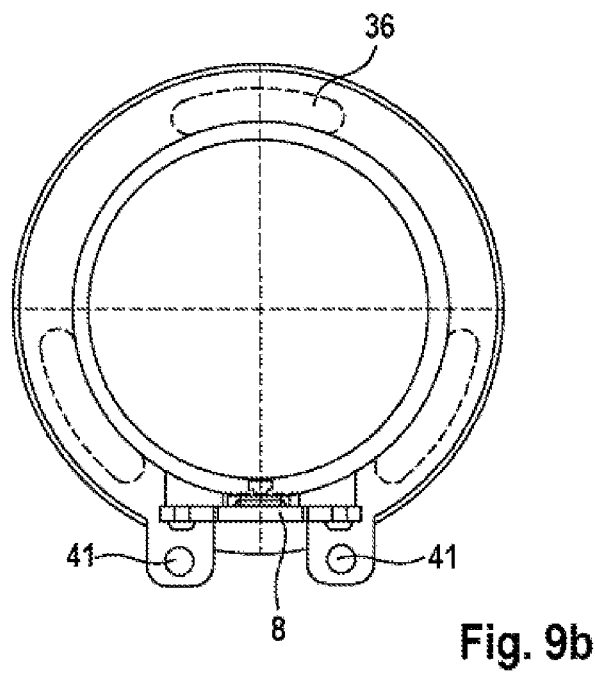

The second embodiment of the inventive sensor arrangement 80, which is illustrated in FIG. 9a in a sectional view and in FIG. 9b in a plan view also has a sensor unit 4. The second embodiment of the sensor arrangement 80 differs from the first embodiment of the sensor arrangement 2 according to the invention in having a further embodiment of the locking ring 82 and a further embodiment of the magnetic flux unit 84.

The sensor unit 4 is supported in a self-guiding fashion between the magnetic-flux-conducting rings 28, 30 of the magnetic flux unit 84, wherein the magnetic-flux-conducting rings 28, 30 are completely encapsulated by injection molding with plastic. A sliding supporting function between the plastic of the sensor unit 4 and the plastic of the magnetic flux unit 6 occurs between the rings 28, 30.

Figure 10A:
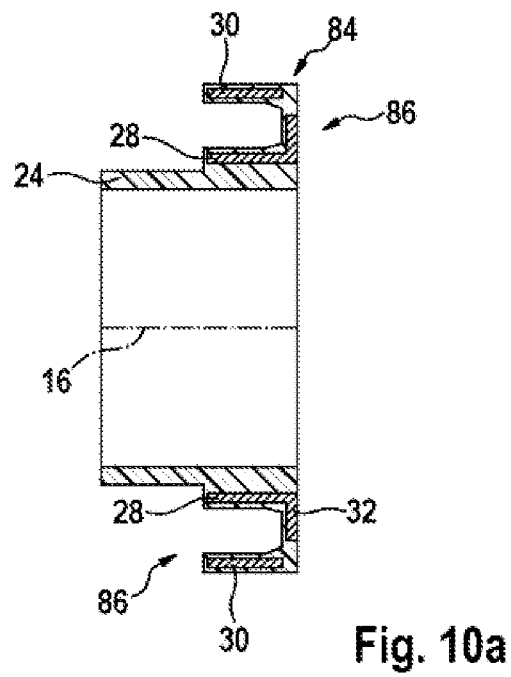
FIG. 10 shows a schematic illustration of details of a magnetic flux unit of the second embodiment of the sensor arrangement according to the invention.
Figure 10B:
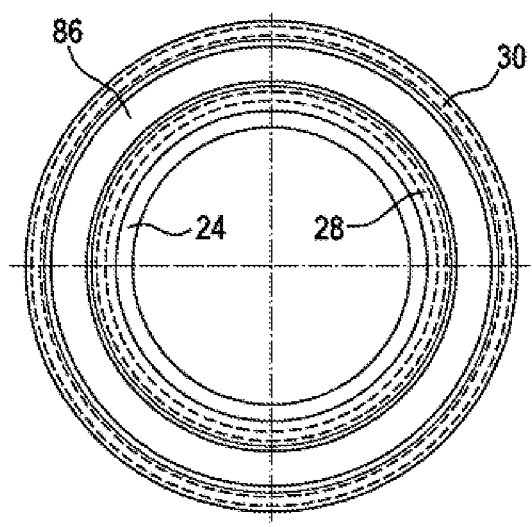

Details relating to the second embodiment of the magnetic flux unit 84 are illustrated schematically in FIG. 10a in a sectional view and in FIG. 10b in a plan view. Here, the magnetic flux unit 84 also comprises a supporting element 24 and a U-shaped double ring 86 which runs around coaxially with respect to the latter and in which the two rings 28, 30 and the finger 32 are embedded. In the present embodiment, the supporting element 24 and U-shaped double ring 86 form one coherent component.

The second embodiment of the magnetic flux unit 84 also comprises an outer ring 28 and an inner ring 30 made of metal, for example NiFe, and fingers 32 which are bent in opposite directions. The rings 28, 30 are completely inserted with tight tolerances into the U-shaped double ring 86 by injection molding with plastic. Bearing tolerances with respect to components of the sensor unit 4 are therefore no longer determined by the manufacturing process of the rings 28, 30 but rather by the encapsulation of the rings 28, 30 with plastic by injection molding.

Figure 11A:
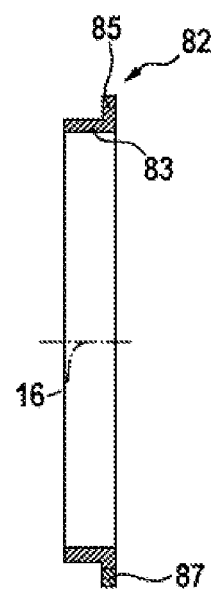
FIG. 11 shows a schematic illustration of details of a locking ring of the second embodiment of the sensor arrangement according to the invention.
Figure 11B:
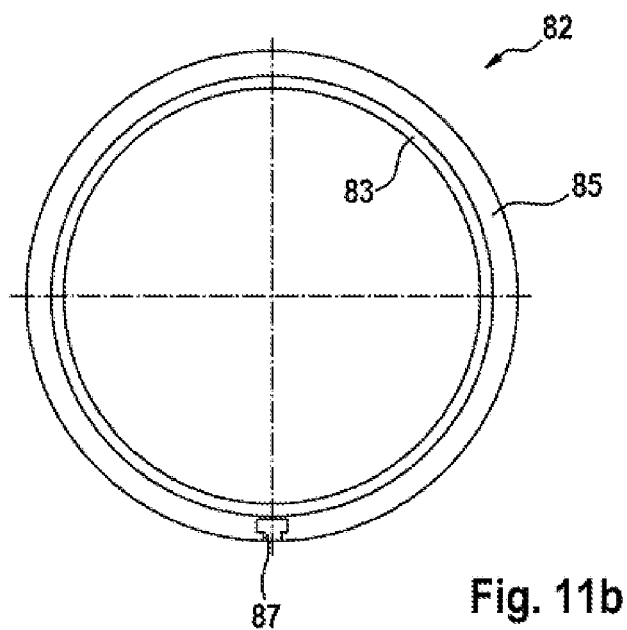

The embodiment of the locking ring 82 which is illustrated schematically in FIG. 11a in a sectional view and in FIG. 11b in a plan view is embodied as a plastic ring in the second embodiment of the sensor arrangement 80 according to the invention, which plastic ring comprises a sleeve 83 and a flange 85. Furthermore, the locking ring 82 comprises, in a lower section, a metal plate 87 which is used as an index element for a switching point of a revolution of the shaft 14. The changing of the magnetic flux in order to make available the index function takes place by means of the metal plate 87 which is inserted by injection molding in the flange 85.

Figure 12:
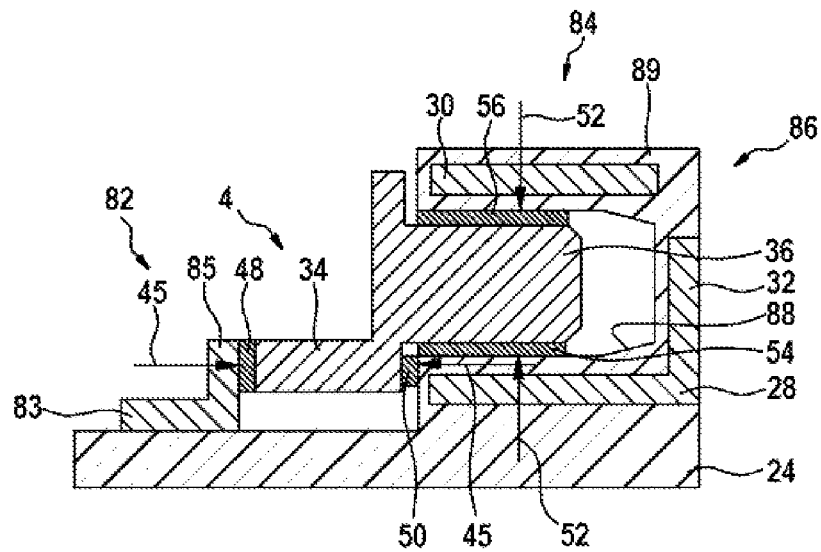
FIG. 12 shows a schematic illustration of details of a bearing arrangement of the second embodiment of the sensor arrangement according to the invention.

FIG. 12 shows a schematic illustration of a bearing arrangement of the sleeve 34 and of a sliding element, embodied as a sliding shoe 36, of the sensor unit 4 relative to the flange 85 of the second embodiment of the locking ring 82 and the two rings 28, 30 of the magnetic flux unit 84 which are embedded in the U-shaped double ring 86. In this context, in order to make available an axial bearing arrangement, a first instance of axial bearing play 48 is provided in the axial direction 45 between the flange 85 of the locking ring 82 and the sleeve 34 of the sensor unit 4. A second instance of axial bearing play 50 is likewise provided in the axial direction 45 between the sleeve 34 of the sensor unit 4 and a first limb 88 of the U-shaped double ring 86 in which the inner ring 28 of the magnetic flux unit 84 is arranged. A first instance of radial bearing play 54 is provided in the radial direction 52 between the first limb 88 with the inner ring 28 of the magnetic flux unit 84 and the sliding shoe 36, and a second instance of radial bearing play 56 is provided between the sliding shoe 36 and the outer ring 30 of the magnetic flux unit 84, which is arranged in an outer limb 89 of the U-shaped double ring 86.

When the shaft rotates, the three sliding shoes 36 of the sensor unit 4 slide radially, with defined play, between the flux-conducting metallic rings 28, 30, completely encapsulated by injection molding with plastic, of the magnetic flux unit 84. The axial locking of the sensor unit 4 is carried out by supporting the sensor unit 4 between the end side, encapsulated by injection molding, of the inner ring 28, and the locking ring 82. The sensor unit 4 and the magnetic flux unit 84 therefore form one unit.

Figure 13:
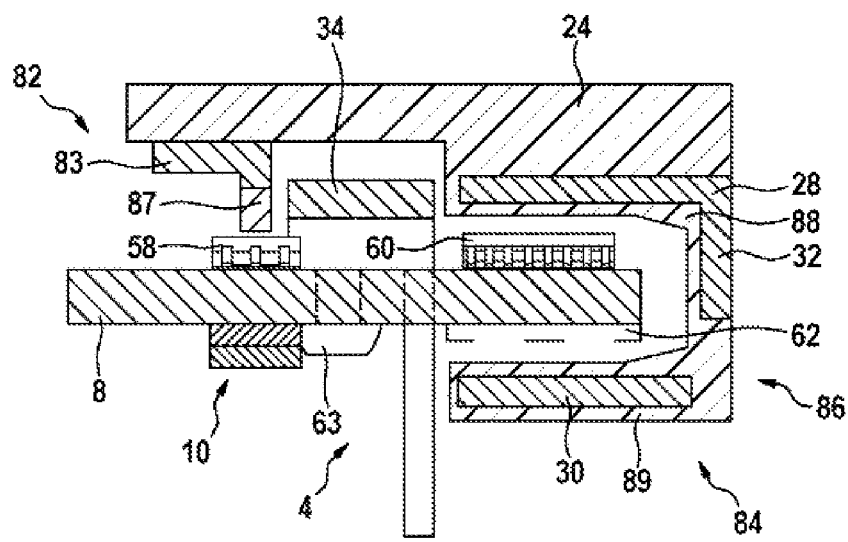
FIG. 13 shows a schematic illustration of details relating to a printed circuit board of the second embodiment of the sensor arrangement according to the invention.

Details relating to an arrangement of the printed circuit board 8 on the second embodiment of the sensor arrangement 80 according to the invention are illustrated schematically in FIG. 13. In this context, FIG. 13 shows that a Hall switch 58 is arranged as a magnetic-field-sensitive sensor on an upper side or on an inner side of the printed circuit board 8 in the vicinity of the locking ring 82. The index magnet 10 is also arranged at the same axial height, on an outer side or an underside of the printed circuit board 8. A Hall circuit 60 is arranged as a magnetic-field-sensitive sensor between the two rings 28, 30 of the magnetic flux unit 84, on the inside of the printed circuit board 8. Furthermore, an optional collector 62 is indicated in FIG. 13. As soon as the metal plate 87 passes the Hall switch 58 in the locking ring 82 during a revolution, the magnetic flux of the index magnet 10 which is embodied as a permanent magnet is influenced and generates a signal in the Hall switch 58 in order to implement the index function.

FIG. 14 is a schematic illustration of a configuration of a magnetic flux unit 100, and FIG. 15 is a schematic illustration of a configuration of a sensor unit 102, of the third embodiment of the sensor arrangement according to the invention.

Figure 14A:
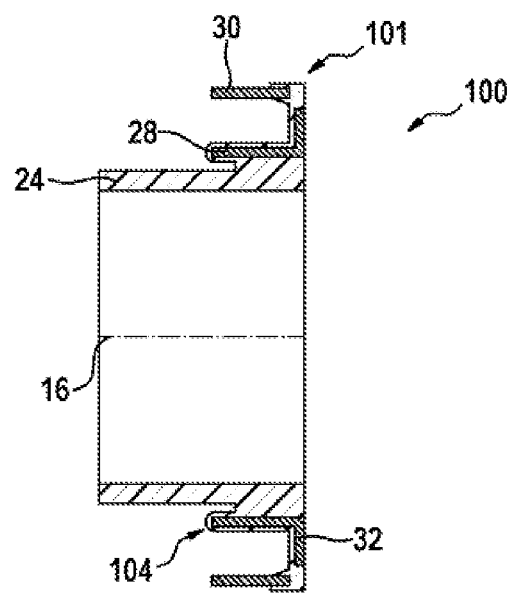
FIG. 14 shows a schematic illustration of an example of a magnetic flux unit of a third embodiment of the sensor arrangement according to the invention.
Figure 14B:
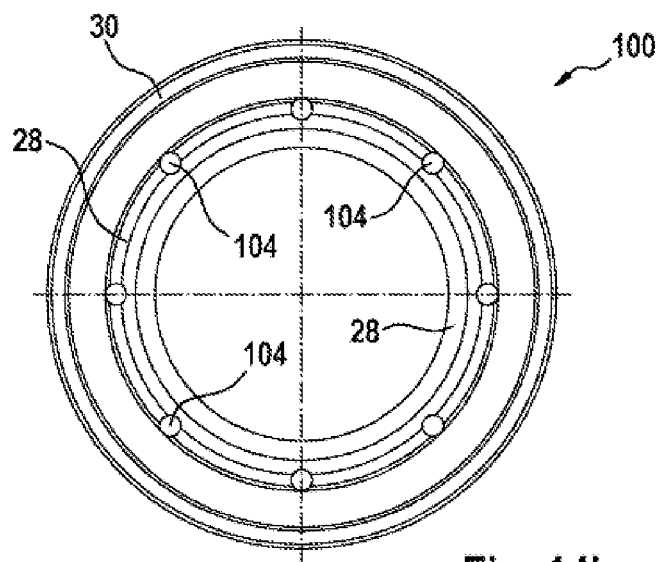

The third example of a magnetic flux unit 100 is illustrated schematically in FIG. 14a in a sectional view and in FIG. 14b in a plan view. This embodiment of the magnetic flux unit 100 also shows a supporting element 24 with a U-shaped double ring 101, to which the rings 28, 30 and the fingers 32 are attached. In this third configuration of the magnetic flux unit 100, the rings 28, 30 are only partially encapsulated by injection molding, wherein the inner ring 28 is partially encapsulated by injection molding with a total of eight bearing journals 104 at an angular interval of 45°. In contrast, the outer ring 30 is not encapsulated by injection molding, as in the first embodiment of the magnetic flux unit 6.

In the magnetic flux unit 100, the inner ring 28 and the outer ring 30 are made of NiFe and have fingers 32 which are bent in opposite directions. These rings 28, 30, or at least one of the rings 28, 30, are/is partially encapsulated by injection molding in plastic with tight tolerances in such a way that the bearing journals 104 have spherical surfaces. The bearing journals 104 provide punctiform support of at least one bearing element of the sensor unit 102 (FIG. 15) on the magnetic flux unit 100. The bearing tolerances with respect to the sensor unit 102 are therefore no longer determined by the manufacturing process of the rings 28, 30 but instead by the partial encapsulation by injection molding of the bearing journals 104 of at least one of these rings 28, 30 with plastic.

Figure 15A:
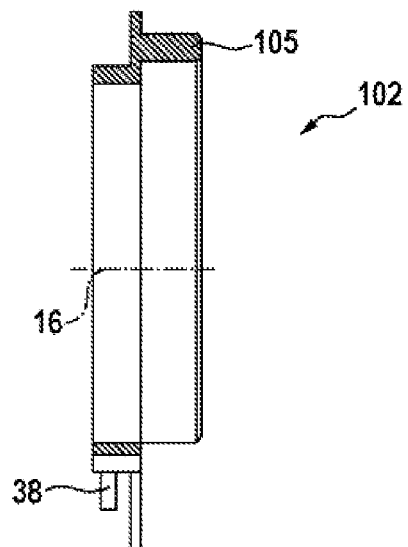
FIG. 15 shows a schematic illustration of an example of the sensor unit of the third embodiment of the sensor arrangement according to the invention.
Figure 15B:
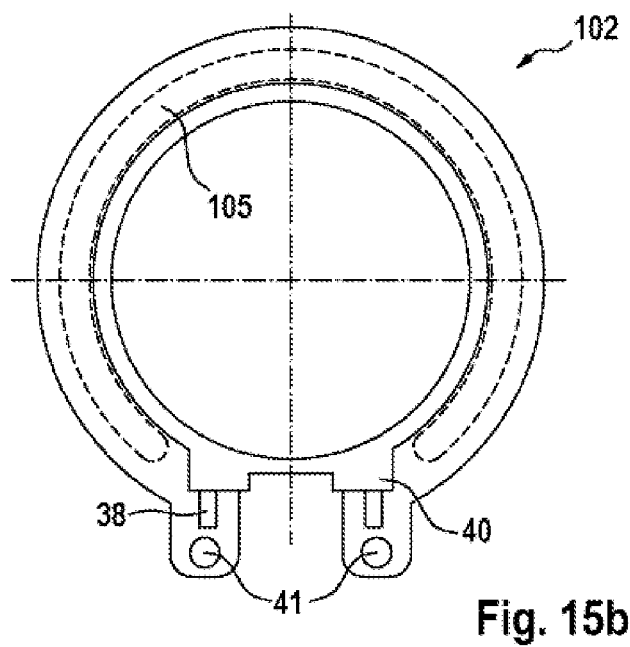

The second configuration of the sensor unit 102 which is illustrated by means of FIG. 15a in a sectional illustration and by means of FIG. 15b in a plan view differs from the first configuration of the sensor unit 4 in that this sensor unit 102 has, instead of sliding shoes 36 as a sliding element, a peripheral rail 105 which comprises an angle≤270° C.

Figure 17A:
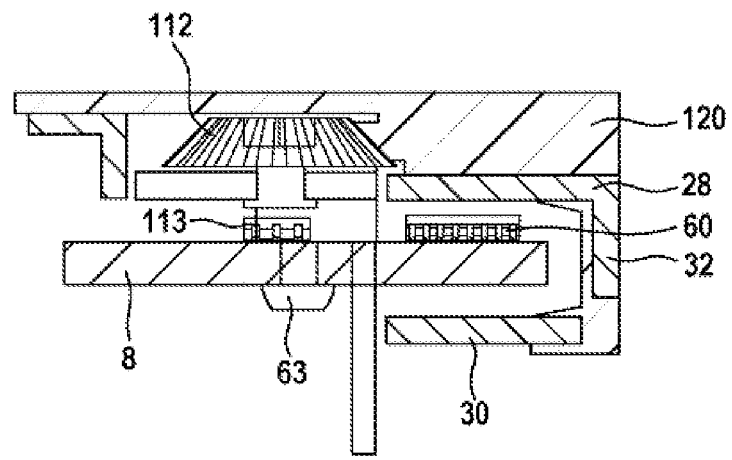
FIG. 17 shows a schematic illustration of details from FIG. 16.
Figure 17B:
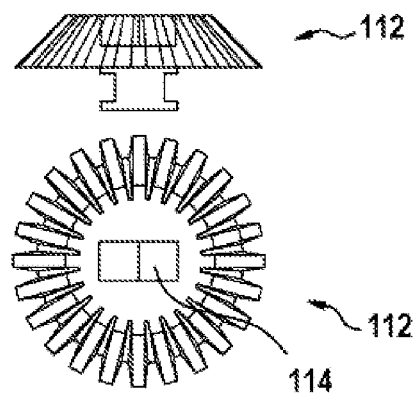

Instead of an index function, in the fourth embodiment of the sensor arrangement 110, which is illustrated schematically in FIG. 16a in a sectional view and in FIG. 16b in a plan view, a steering angle function is integrated. According to the invention for this purpose a small bevel gear 112 (FIG. 16b or 17b) is attached to the sensor unit 4 in such a way that a Hall circuit 113 is arranged as a magnetic-field-sensitive sensor on the printed circuit board 8 directly under the center of the small bevel gear 112 in and/or on which a permanent magnet 114 is attached. In the fourth configuration, shown here, of a magnetic flux unit 116, an opposing bevel gear 118 is implemented with an alternative configuration of a bearing element 120. Details from FIG. 16 are illustrated in an enlarged form in FIG. 17.

Figure 19A:
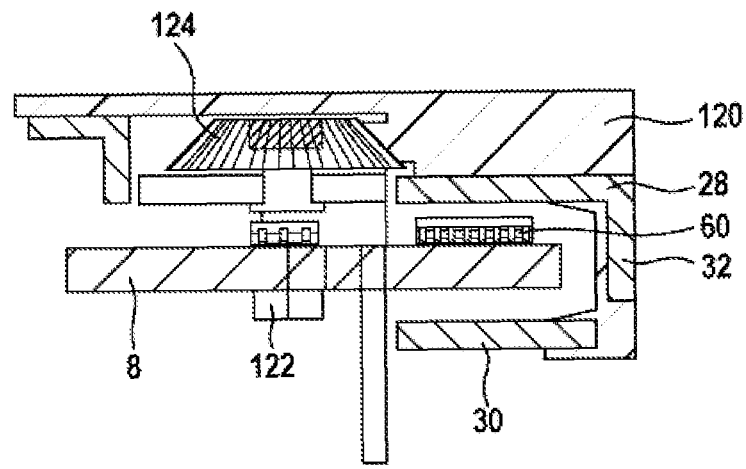
FIG. 19 shows details from FIG. 18.
Figure 19B:
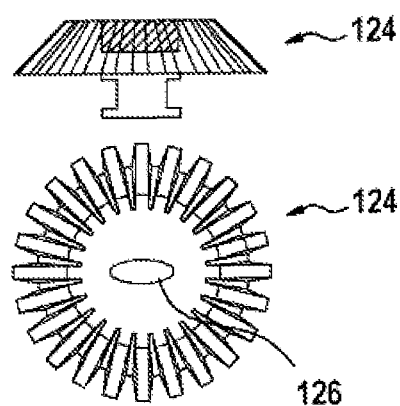

An alternative steering angle function of a fifth embodiment of a sensor arrangement 121 according to the invention is illustrated schematically in FIG. 18. Here, a permanent magnet is attached to the printed circuit board 8. In and/or on the bevel gear 124, a metal plate 126 made of NiFe and therefore of the same material as the magnetic-flux-conducting rings 28, is attached, which metal plate 126 influences the magnetic field of the permanent magnet 122 when the shaft 14 rotates. Details on this embodiment can be found in FIG. 19.

The bevel gear mechanism represented by the bevel gear 112 and the opposing bevel gear 118 can, in a further embodiment (not illustrated here) also be embodied as a crown gear mechanism with a crown gear and an opposing crown gear.

Figure 20A:
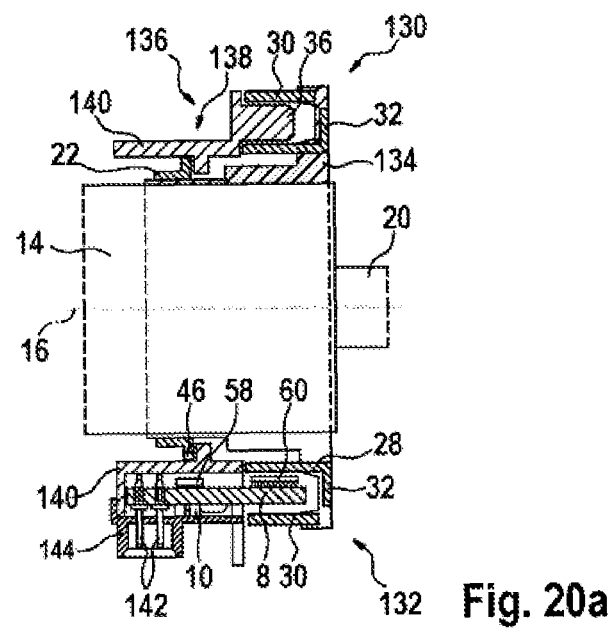
FIG. 20 shows a schematic illustration of a fifth embodiment of the sensor arrangement according to the invention.
Figure 20B:
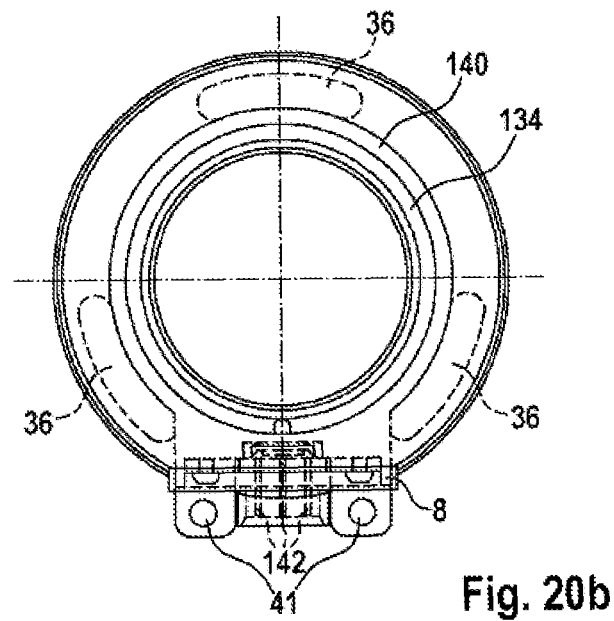
Figure 21:
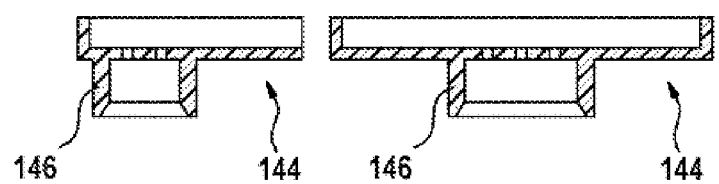
FIG. 21 shows a detail from FIG. 20.
Figure 22:
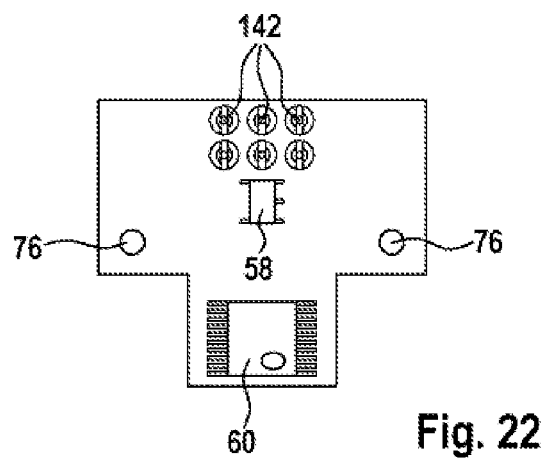
FIG. 22 shows a further detail from FIG. 20.

A fifth embodiment of the sensor arrangement 130 according to the invention for determining a torque, which acts on a shaft 14, is illustrated schematically in FIG. 20a in a sectional view and in FIG. 20b in a plan view. Here, the sensor arrangement 130 comprises a magnetic flux unit 132 with a supporting element 134 which is attached to the shaft 14 and has a double ring 26 which is U-shaped in profile and in which magnetic-flux-conducting rings 28, 30 and fingers 32 which are arranged on these rings 28, 30 are embedded. Furthermore, a locking ring 22 is arranged on the supporting element 134.

The sensor arrangement 130 shown here also comprises a configuration of the sensor unit 136 with an expanded sleeve 138, which comprises a first housing part 140 for accommodating a printed circuit board 8 with magnetic-field-sensitive sensors, i.e. a Hall switch 58 and a Hall circuit 60 and an index magnet 10. Three sliding shoes 36 are arranged as sliding elements on the expanded sleeve 138. Furthermore, press-in pins 142 are arranged on the printed circuit board 8.

The printed circuit board 8 can be protected in the region of the sensor unit 136 outside the rings 28, 30 by a cover 144 as a second housing part. For this purpose, the sensor unit 136 is constructed in such a way that the printed circuit board 8 is located in a box which is open to the magnetic flux unit 132 and is bounded by the expanded sleeve 138. For this purpose, the cover 144 has at the same time a plug interface 146. As a result, a plug housing is made available structurally by the cover 144. The press-in pins 142 are pressed in onto the printed circuit board 8 by an SPI (single pin insertion) process, said press-in pins 142 constituting at the same time the plug contacts. When the cover 144 is mounted, these plug contacts are plugged through corresponding openings on the cover 144. As a result, the printed circuit board 8 is well covered outside the rings 28, 30. There is no need for an SMD plug for print mounting of the printed circuit board 8.

The described embodiments of the sensor arrangement 2, 80, 110, 121, 130 generally differ through configurations of individual components of such sensor arrangements 2, 80, 110, 121, 130. In this context, embodiments of the sensor units 4, 102, 136 of the magnetic flux unit 6, 84, 100, 116, 132 and of the locking means 22, 82 usually vary. With respect to the third embodiment (not illustrated further) of the sensor arrangement according to the invention, the magnetic flux unit 100 (FIG. 14) and the sensor unit 102 (FIG. 15) are to be arranged on the first shaft 14 in an analogous fashion to the sensor unit 4 and the magnetic flux unit 6, 84 of the two first embodiments of the sensor arrangement 2, 80 according to the invention. However, it is possible for different embodiments of sensor units 4, 102, 136 of magnetic flux units 6, 84, 100, 116, 132 and of locking rings 22, 82 to be combined with one another in any desired fashion with the result that further embodiments (not described here) of sensor arrangements 2, 80, 110, 121, 130 can be made available from the specified components.

Figure 23A:
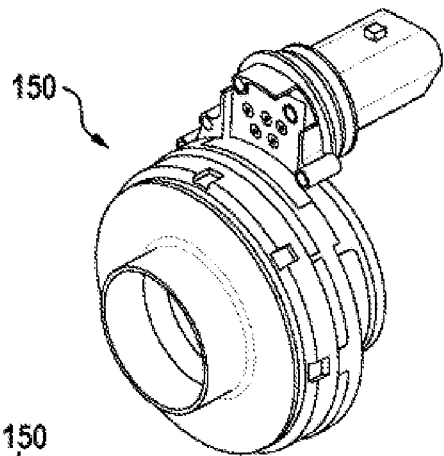
FIG. 23 shows an example of a torque sensor which is known from the prior art.
Figure 23B:
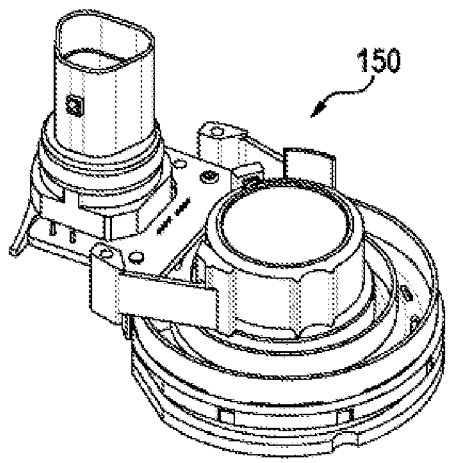
Figure 23C:
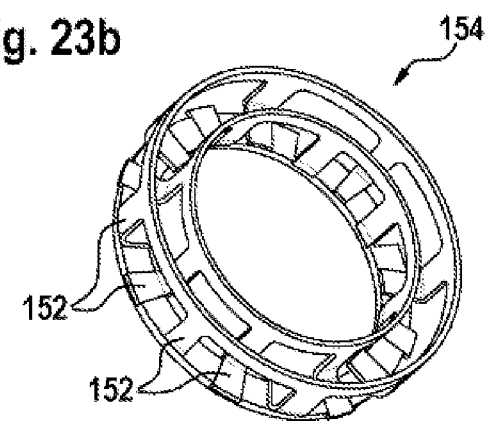

FIG. 23 shows in a schematic illustration an arrangement 150 which is known from the prior art and has the purpose of measuring a torque, which arrangement comprises two measuring rings 154 with bent fingers 152 made of NiFe sheet metal. This arrangement 150 is referred to as a magnetically measuring torque sensor TSS-1 from Robert Bosch GmbH.

Figure 24A:
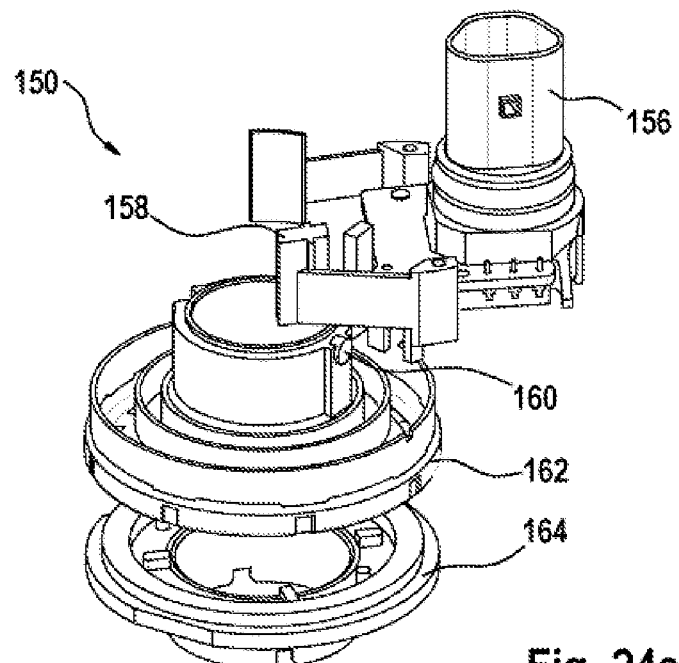
FIG. 24 shows details from FIG. 23.
Figure 24B:
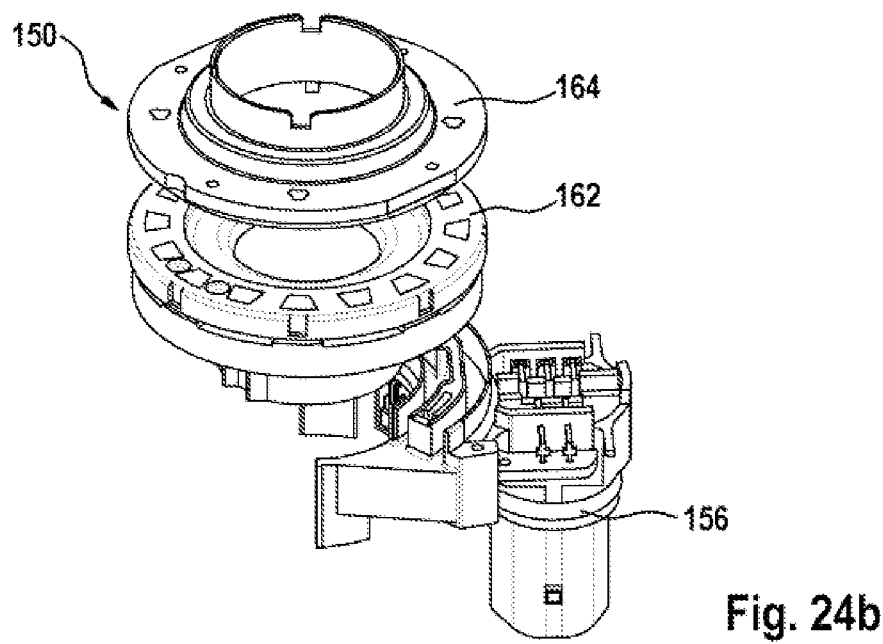

FIG. 24 shows details of the arrangement 150 from FIG. 23, specifically a sensor unit 156, an index Hall element 158, an index magnet 160, a so-called flex tube unit 162, which comprises the two measuring rings 154 and a magnetic unit 164.

In order to manufacture this arrangement 150, inter alia scoop soldering methods or wave soldering methods must be used, which are generally more complex and expensive than a standard reflow process. With this concept, additional integration of a steering angle measurement is not possible.

The invention claimed is:

1. A sensor arrangement for capturing a torque which acts on a shaft having a combination of a sensor unit with a sleeve on which at least one sliding element and at least a first magnetic-field-sensitive sensor are arranged, and a magnetic flux unit with two magnetic-flux-conducting rings wherein the sensor unit and the magnetic flux unit are rotated relative to one another when the shaft rotates, and wherein the at least one magnetic-field-sensitive sensor captures a magnetic flux which is conducted by the rings, wherein, with the at least one magnetic-field-sensitive sensor, a magnetic field which changes during a rotational movement is detected and is converted into a signal which is dependent on the torque, wherein the at least one sliding element made of plastic is arranged between the magnetic-flux-conducting rings and slides radially between the magnetic-flux-conducting rings.

2. The sensor arrangement as claimed in claim 1, in which the at least one sliding element is mounted in a direct, sliding and self-guiding fashion between the magnetic-flux-conducting rings of the magnetic flux unit.

3. The sensor arrangement as claimed in claim 1, in which the at least one first magnetic-field-sensitive sensor of the sensor unit is arranged between the magnetic-flux-conducting rings.

4. The sensor arrangement as claimed in claim 1, in which the magnetic-flux-conducting rings are arranged on a bearing element of the magnetic flux unit wherein at least one of the magnetic-flux-conducting rings is at least partially encapsulated by injection molding with plastic.

5. The sensor arrangement as claimed in claim 1, in which a bearing play is provided in the axial and radial direction between at least one component of the sensor unit and at least one further component of the sensor arrangement which can rotate with respect to the sensor unit.

6. The sensor arrangement as claimed in claim 1, which sensor arrangement comprises a locking ring which is rotated relative to the sensor unit when the shaft rotates, wherein the sleeve of the sensor unit is arranged between the locking ring and one of the magnetic-flux-conducting rings of the magnetic flux unit.

7. The sensor arrangement as claimed in claim 6, in which the locking ring has an index element with which revolutions of the shaft is counted by the at least one magnetic field sensitive sensor of the sensor unit.

8. The sensor arrangement as claimed in claim 1, in which a gear is arranged on the sensor unit, and an opposing gear is arranged on the magnetic flux unit, wherein teeth of the gear and of the opposing gear mesh with one another and rotate when the shaft rotates, wherein a rotational angle of the shaft can be determined by means of a rotation of the gear.

9. The sensor arrangement as claimed in claim 8, wherein the gear and the opposing gear are small bevel gears.

10. The sensor arrangement as claimed in claim 8, wherein the gear and the opposing gear are crown gears.

11. The sensor arrangement as claimed in claim 1, in which at least one printed circuit board (8, 70), on which the at least one first magnetic-field-sensitive sensor is arranged, is arranged on the sensor unit.

12. The sensor arrangement as claimed in claim 1, in which the at least one sliding element is mounted in a self-guiding fashion between the magnetic-flux-conducting rings of the magnetic flux unit.

13. The sensor arrangement as claimed in claim 1, in which bearing play is provided in the axial direction between at least one component of the sensor unit and at least one further component of the sensor arrangement which can rotate with respect to the sensor unit.

14. The sensor arrangement as claimed in claim 1, in which bearing play is provided in the radial direction between at least one component of the sensor unit and at least one further component of the sensor arrangement which can rotate with respect to the sensor unit.

15. A method for capturing a torque which acts on a shaft which method is carried out using a sensor arrangement which comprises a sensor unit with a sleeve on which at least one sliding element and at least a first magnetic-field-sensitive sensor are arranged, and a magnetic flux unit with two magnetic-flux-conducting rings wherein the sensor unit and the magnetic flux unit are rotated relative to one another when the shaft rotates, and wherein a magnetic flux which is conducted by the rings is captured by the at least one magnetic-field-sensitive sensor, wherein, with the at least one magnetic-field-sensitive sensor, a magnetic field which changes during a rotational movement is detected and is converted into a signal which is dependent on the torque, characterized in that the at least one sliding element made of plastic is arranged between the magnetic-flux-conducting rings and slides radially between the magnetic-flux-conducting rings.

16. The sensor arrangement as claimed in claim 1, in which the at least one sliding element is mounted in a direct, sliding fashion between the magnetic-flux-conducting rings of the magnetic flux unit.

* * * * *